(12) United States Patent
Gandelman Milgrom et al.

(10) Patent No.: US 12,476,903 B2
(45) Date of Patent: Nov. 18, 2025

(54) NETWORK PARTITION FILTER

(71) Applicant: MELLANOX TECHNOLOGIES, LTD., Yokneam (IL)

(72) Inventors: Michael Avimelech Gandelman Milgrom, Aventura, FL (US); Lior Hodaya Bezen, Tel-Aviv (IL); Alex Netes, Rehovot (IL); Yoav Menes, Tel Aviv (IL); Guy Rozenberg Kunievsky, Rehovot (IL); Vladimir Koushnir, Rishon Le Zion (IL); Lion Levi, Yavne (IL); Eitan Zahavi, Zichron Yaakov (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 358 days.

(21) Appl. No.: 18/113,240

(22) Filed: Feb. 23, 2023

(65) Prior Publication Data
US 2024/0291749 A1     Aug. 29, 2024

(51) Int. Cl.
| | |
|---|---|
| *H04L 12/66* | (2006.01) |
| *H04L 45/00* | (2022.01) |
| *H04L 45/745* | (2022.01) |
| *H04L 47/2416* | (2022.01) |
| *H04L 49/111* | (2022.01) |

(52) U.S. Cl.
CPC ............ *H04L 45/26* (2013.01); *H04L 45/745* (2013.01); *H04L 47/2416* (2013.01); *H04L 49/111* (2022.05)

(58) Field of Classification Search
CPC ... H04L 41/0895; H04L 49/90; H04L 49/901; H04L 12/56; H04L 47/10; H04L 49/9057; H04L 45/74; H04L 49/70; H04L 41/0803; H04L 45/54; H04L 45/586; H04L 12/28; H04L 12/46; H04L 41/0886; H04L 41/0883; H04L 41/0876; H04L 41/08; H04L 45/745; H04L 49/35; H04L 45/566; H04L 41/0894
See application file for complete search history.

(56) References Cited

U.S. PATENT DOCUMENTS

| | | | | |
|---|---|---|---|---|
| 2008/0240106 A1* | 10/2008 | Schlenk | ................ | H04L 45/54 370/392 |
| 2013/0272135 A1* | 10/2013 | Leong | ................ | H04L 41/0853 370/254 |
| 2014/0195666 A1* | 7/2014 | Dumitriu | ................ | H04L 43/55 709/223 |
| 2015/0063364 A1* | 3/2015 | Thakkar | ................ | H04L 45/22 370/401 |
| 2016/0080261 A1* | 3/2016 | Koponen | ................ | H04L 45/74 370/392 |
| 2016/0352637 A1* | 12/2016 | Wakumoto | .......... | H04L 61/5007 |
| 2018/0109441 A1* | 4/2018 | Meyer | ................ | H04J 3/0667 |
| 2022/0353174 A1 | 11/2022 | Kfir et al. | | |

* cited by examiner

*Primary Examiner* — Kharye Pope
(74) *Attorney, Agent, or Firm* — Sheridan Ross PC

(57) ABSTRACT

A networking device and system are described, among other things. An illustrative system is disclosed to include a switch programmed to route a received packet to an egress port based on a combination of a destination address associated with the received packet and an identification of an ingress port from which the packet was received by the switch.

20 Claims, 6 Drawing Sheets

| Dest. Add. | 1:0 | 1:2 | 1:3 | 1:4 | 1:5 | 1:6 | 1:7 | 2:0 | 2:1 | 2:3 | 2:4 | 2:5 | 2:6 | 2:7 | ... |
|---|---|---|---|---|---|---|---|---|---|---|---|---|---|---|---|
| A | 1 | 0 | 1 | 1 | 1 | 1 | 0 | 1 | 1 | 1 | 0 | 1 | 1 | 0 | ... |
| B | 1 | 1 | 1 | 0 | 0 | 1 | 0 | 0 | 1 | 0 | 0 | 1 | 0 | 1 | ... |
| C | 1 | 1 | 0 | 1 | 1 | 1 | 1 | 1 | 1 | 0 | 1 | 1 | 1 | 0 | ... |
| D | 1 | 1 | 1 | 0 | 0 | 0 | 1 | 0 | 0 | 1 | 0 | 1 | 0 | 0 | ... |
| E | 1 | 1 | 0 | 1 | 1 | 0 | 0 | 1 | 1 | 1 | 1 | 1 | 0 | 1 | ... |
| F | 0 | 0 | 1 | 0 | 0 | 1 | 1 | 0 | 1 | 0 | 0 | 1 | 1 | 0 | ... |
| G | 0 | 1 | 0 | 0 | 1 | 0 | 0 | 0 | 0 | 0 | 0 | 1 | 0 | 1 | ... |
| H | 1 | 0 | 1 | 1 | 0 | 1 | 0 | 0 | 0 | 1 | 1 | 1 | 0 | 1 | ... |

NETWORK PARTITION FILTER

FIELD

The present disclosure is generally directed to systems, methods, and devices for transmitting packets from a network device and, in particular, logically partitioning a communication network.

BACKGROUND

Today's users of computers rely on computer networks for performing a variety of tasks, from creating and implementing AI models to handling large amounts of data. Thanks to cloud-computing and other network-based technologies, a variety of users can share a common set of switches and other networking devices.

To provide a common set of networking devices to a variety of users, partitioning is required to improve security and performance. However, modern computing networks are insufficient in providing partitioning capabilities. Contemporary solutions to partitioning a network are lacking in security, ease-of-use, performance, and efficiency.

SUMMARY

Embodiments of the present disclosure relate to directing packets through a network. Systems and methods described herein provide a capability of logically isolating ports in a communication network by directing packets based on both a destination address as well as a port of ingress. Embodiments of the present disclosure include a system for providing dynamic logical port isolation, the system comprising a processor and a memory device coupled with the processor, wherein the memory device comprises data stored thereon that, when processed by the processor, enables the processor to: receive a packet; identify an ingress port and a destination address associated with the packet; determine, based on the ingress port and the destination address, one or more egress ports authorized to transmit the packet; and in response to determining the one or more egress ports authorized to transmit the packet, forward the packet to the destination address via the one or more egress ports.

Aspects of the above system include wherein the packet is received via the ingress port, wherein the processor is provided in a flow manager or managing device of a switch, and wherein the packet is received from a switch. Further aspects of the above system include a filter table is referenced to determine that the one or more egress ports are authorized to transmit the packet, wherein the filter table lists, for each of a plurality of destination addresses, one or more sets of pairs of ingress ports and egress ports authorized for transmission, wherein the filter table is received from a network managing device, and wherein the filter table is modified based at least in part on traffic data received by the system.

Additionally, aspects of the above system include wherein determining the one or more egress ports authorized to transmit the packet is based at least in part on traffic data received by the system, wherein for packets associated with a particular destination address, one or more ingress ports are isolated from one or more egress ports, and wherein a first packet associated with a first destination address and received via a first ingress port is authorized to be transmitted from a first egress port and a second packet associated with a second destination address and received via the first ingress port is not authorized to be transmitted from the first egress port.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

The present disclosure is described in conjunction with the appended figures, which are not necessarily drawn to scale.

DETAILED DESCRIPTION

Figure 1:
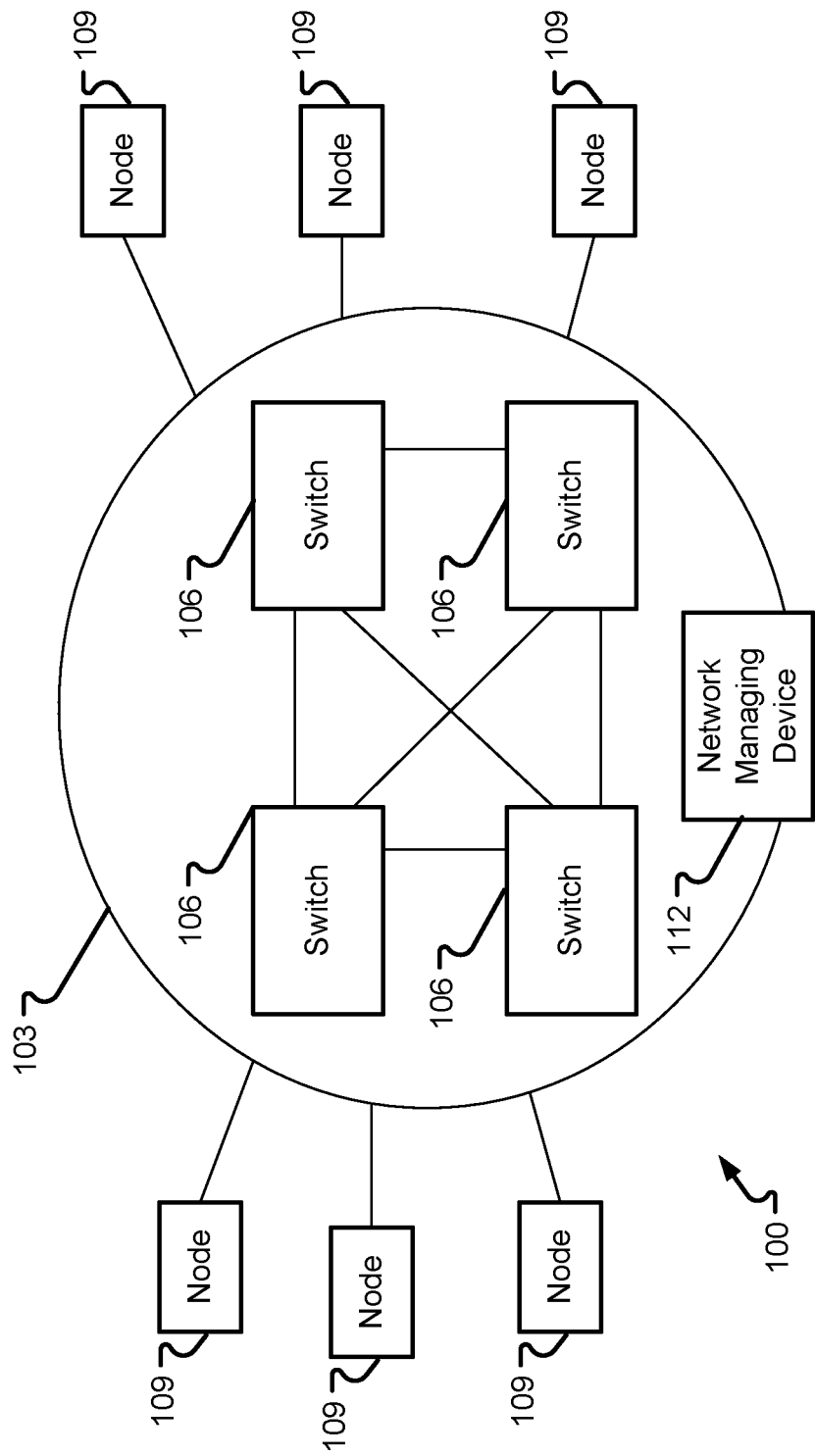
FIG. 1 is a block diagram of a networking environment in accordance with one or more of the embodiments described herein.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

The details of one or more aspects of the disclosure are set forth in the accompanying drawings and the description below. Other features, objects, and advantages of the techniques described in this disclosure will be apparent from the description and drawings, and from the claims.

The phrases "at least one," "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as X1-Xn, Y1-Ym, and Z1-Zo, the phrase is intended to refer to a single element selected from X, Y, and Z, a combination of elements selected from the same class (e.g., X1 and X2) as well as a combination of elements selected from two or more classes (e.g., Y1 and Zo).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

Numerous additional features and advantages are described herein and will be apparent to those skilled in the art upon consideration of the following Detailed Description and in view of the figures.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

It will be appreciated from the following description, and for reasons of computational efficiency, that the components of the system can be arranged at any appropriate location within a distributed network of components without impacting the operation of the system.

Further, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a Printed Circuit Board (PCB), or the like.

The terms "determine," "calculate," and "compute," and variations thereof, as used herein, are used interchangeably and include any appropriate type of methodology, process, operation, or technique.

Various aspects of the present disclosure will be described herein with reference to drawings that may be schematic illustrations of idealized configurations.

Any of the steps, functions, and operations discussed herein can be performed continuously and automatically.

The exemplary systems and methods of this disclosure have been described in relation to a network of switches; however, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

A number of variations and modifications of the disclosure can be used. It would be possible to provide for some features of the disclosure without providing others.

References in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in conjunction with one embodiment, it is submitted that the description of such feature, structure, or characteristic may apply to any other embodiment unless so stated and/or except as will be readily apparent to one skilled in the art from the description. The present disclosure, in various embodiments, configurations, and aspects, includes components, methods, processes, systems and/or apparatus substantially as depicted and described herein, including various embodiments, sub combinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B, and C together. When each one of A, B, and C in the above expressions refers to an element, such as X, Y, and Z, or a class of elements, such as X1-Xn, Y1-Ym, and Z1-Zo, the phrase is intended to refer to a single element selected from X, Y, and Z, a combination of elements selected from the same class (e.g., X1 and X2) as well as a combination of elements selected from two or more classes (e.g., Y1 and Zo).

As illustrated in FIG. 1, a computing environment 100 may comprise a network 103 which may be used to interconnect multiple nodes 109, such as computers, servers, memory devices, etc. The network 103 may comprise a number of switches 106 or other network devices. The switches 106 of the network 103 may act as a hub, forwarding data packets between the nodes 109 on the network 103. The switches 106 can also be used, as described herein, to segment the network 103 into smaller, more manageable subnets. The division of a network 103 into subnets may enable better control of network traffic and improved security. Additionally, while not illustrated in FIG. 1, switches 106 can also be used to connect multiple networks 103 together, allowing for communication between different networks 103.

A network managing device 112 may be in communication with one or more switches 106 of the network 103. In some embodiments, the network managing device 112 may perform tasks as a network manager and/or a fabric manager. The network managing device 112 may be capable of instructing switches 106 to handle packet routing in particular ways based on destination addresses and ingress ports as described herein.

The network managing device 112 may be capable of automating and simplifying the management of a network infrastructure. The network managing device 112 provides a centralized interface for network administrators to configure, monitor, and troubleshoot network devices, such as routers, switches, and firewalls.

The network managing device 112 may be capable of managing the routing of packets by providing a centralized interface for network administrators to configure, monitor, and troubleshoot the various ports on switches 106 or other network devices. Specifically, the network managing device 112 may be capable of providing the following functionality:

Port configuration: The network managing device 112 may execute software allowing network administrators to configure the ports on network devices, such as switches 106 and routers.

Port monitoring: The network managing device 112 may provide real-time visibility into the status and performance of ports on network devices. This includes monitoring for errors, such as collisions and dropped packets, and identifying potential performance bottlenecks.

Port automation: The network managing device 112 can automate tasks associated with managing ports on network devices. This includes automatically disabling ports that are not in use and enabling ports that are needed. It can also automatically enable or disable ports based on predefined policies.

Port isolation: The network managing device 112 can provide port isolation functionality, which allows network administrators to segment a network by isolating specific ports on a switch 106 or router. This can be used to create separate VLANs for different departments, or to isolate a specific device or user on the network 103.

Port security: The network managing device 112 can provide advanced security features to protect the network 103 from unauthorized access and other threats. This includes features like port security, which allows network administrators to restrict access to specific ports based on destination addresses and/or ingress ports.

A network 103 as described herein may be used by a number of different related or unrelated entities. For example, two companies may each rely upon a single cloud-computing network to perform tasks such as AI processes. Cloud computing networks can be used to perform AI tasks by providing the necessary resources and infrastructure to support the computationally intensive process of training and running AI models. For example, data may be collected and stored on the cloud, where it is easily accessible to the AI algorithms. AI models may then be trained on this data using powerful cloud-based computing resources, such as GPUs. Once a model is trained, it can be deployed on the cloud, where it can be accessed by users from anywhere with an internet connection. Users can then use the deployed model to make predictions or perform other AI tasks, such as image recognition or natural language processing, on new data. Additionally, cloud-based AI services provide various pre-trained models and services like image, speech, natural language, etc. out of the box which can be directly consumed in the application without the need of training models.

By using cloud computing networks, organizations can take advantage of the scalability and flexibility of the cloud to quickly and easily train and deploy AI models. This eliminates or reduces the need to invest in expensive hardware and infrastructure to support AI development, making it accessible to a wide range of organizations.

As another example, a network 103 may be used by a single user to execute multiple concurrent jobs. The single user may utilize the network 103 to send packets of data across the network 103 to accomplish processes relating to a variety of tasks. The systems and methods described herein improve the capabilities of a network 103 when used any number of one or more users.

A plurality of nodes 109 can be connected to the switches 106 of the network 103. For example, GPUs, CPUs, storage devices, etc., may be connected to the switches 106. Such switches 106 may act as the gateways for the nodes 109, which may be referred to as destinations or endpoints, to get to the network 103. Multiple nodes 109 may be connected to each switch 106. Each node 109 may be associated with one or more destination addresses.

Each switch 106 of a network 103 may be capable of routing traffic, i.e., packets, to any destination address which is accessible in some way to the switch 106.

In some embodiments, a network 103 may be partitioned into one or more exclusive areas. A network 103 may be partitioned in order to confine flows to one or more specific paths. Reasons for partitioning a network 103 include security, performance isolation, and preserving flow integrity, among others.

There are several reasons why a user might partition a network 103:
- Security: By dividing a network 103 into smaller segments or subnets, it is more difficult for unauthorized users to gain access to sensitive information. Each segment can be secured with its own set of security measures, such as firewalls or access controls. By isolating traffic based on ingress ports, the disclosed systems and methods improve the ability to secure a network 103 against specific users from purposely congesting parts of the network 103 to affect the performance of one or more other users, such as in a denial of service attack.
- Performance: A large network 103 can become congested with traffic, leading to slow performance. Partitioning the network 103 allows for better control of network traffic, helping to ensure that bandwidth-intensive applications and services do not adversely affect other parts of the network 103. Partitioning a network 103 as described herein also improves the network 103 by containing the effect of any particular network device's faults and failures to a single job instead of damaging the performance of other jobs.
- Scalability: As a network grows, it can become more difficult to manage and maintain. Partitioning the network allows for the creation of smaller, more manageable subnets, which can be easily expanded as the network grows.
- Organization: Dividing a network 103 into smaller segments can make it easier to organize and manage devices, as well as troubleshoot and diagnose issues. For example, it can be easier to identify and isolate a problem when devices are grouped into smaller, more manageable subnets.
- Compliance: Some industry or regulations require networks to be partitioned for security reasons and compliance with regulatory requirements.
- Partitioning a network is a common practice in networking, and it can help to improve security, performance, scalability, organization and compliance.

The partitioning of a network 103 into exclusive areas creates a problem. The routing of packets must be managed to ensure a packet is not directed from an ingress port to an egress port which should be isolated from the ingress port. Using a system as described herein provides for the logical isolation of ports within a switch 106 using rules which can be updated on-the-fly.

Also, in the case of multi-cast communication applications, if different sections of a network 103 meet in several points, packets crossing at particular points may be duplicated. By isolating the different sections, the unnecessary duplication can be avoided. Using a system as described herein reduces the bandwidth required for packet routing management and increases performance of the network 103.

Port isolation is a technique used in networking to keep one or more ports separate from the rest of the network 103, preventing them from communicating with other devices. This is useful to keep a part of the network 103 isolated from the rest and prevent unwanted traffic from crossing the boundary. This feature could be used to isolate a rogue device, a port with a security breach, or just to keep devices with sensitive information separate from the rest of the network 103.

Nodes 109 in communication with the network 103 send packets of data to the network 103 and receive packets of data from the network 103. To ensure fast speeds, the packets may be sprayed through one or more switches 106 of the network 103 using a variety of routing methods.

Packet spraying is a technique used to distribute data packets across multiple paths in a network 103. The process involves using a switch 106 to replicate incoming data packets and send them out over multiple output ports, in order to balance the load on the network 103 and improve performance.

The switch 106 examines the destination address of the incoming packet, and then sends copies of the packet out to multiple output ports, rather than just the single port that would be used for traditional packet switching. This allows for the packets to be distributed more evenly across the network 103, reducing the risk of congestion and improving overall network performance.

Packet spraying is commonly used in load balancing and traffic management. By spreading the traffic across multiple paths, it reduces the risk of a single link becoming overwhelmed and causing congestion. This improves the overall performance of the network 103, and ensures that data packets are delivered quickly and reliably. Additionally, packet spraying can be used in conjunction with other techniques like link aggregation, Quality of Service, and Network Address Translation, to provide a more robust and efficient network infrastructure.

When a packet is sent towards multiple destinations, such as in multi-cast communications and other communication methods, the packet is duplicated along the way to its many destinations. When a switch 106 replicates and sends out copies of a packet to multiple output ports, there is a risk that some of the copies will reach the node 109 multiple times. This can happen if the switch 106 does not implement mechanisms to prevent packet duplication, or if the network topology is such that multiple copies of the same packet can reach the node 109 via different paths. Using a system as described herein, packet duplication caused by spraying or other reasons can be avoided through the routing of packets using a filter table.

For example, in multi-cast communication, many nodes may be senders and receivers simultaneously. At each switch, egress ports are identified that lead to each particular sender and/or receiver. Packets are addressed to this multi-cast group of devices. When a packet arrives to the switch addressed to the multi-cast group, the packet will be copied and sent via each identified egress port. This creates an issue. Namely, if more than one egress port leads to a given destination unnecessary duplicates will be created. Also, if one of the identified egress ports leads not only directly to the destination but also to a path that circles back to the source, the source will receive the same packet the source sent. Using a system as described herein, these problems can be averted by closing off specific egress ports depending on both the ingress port and destination addresses. Using such a system enables port isolation to take into account the direction of the source and information relating to the path to be traveled by particular packets on the way to the destination.

Using a system or method as described herein, new partitions on the network 103 may be created on the fly. Because new partitions on the network 103 may be created on the fly, rules managing the routing of packets may need to be constantly changed.

The present disclosure involves an additional step in a network node's 109 routing decision flow which filters the flow of packets between every input/output port pair according to the logical partition guidelines for the topology. This allows for logical isolation of output ports from input ports, thus implementing the overall topological isolation policies.

As described herein, a new routing mechanism may be used to regulate the transmission of packets between logical partitions of a network 103 at their nodes 109 of convergence. Using a system as described herein, a portion of a network 103 may effectively be off bounds to particular packets. The systems and methods described herein introduce a new layer in the routing in such a way that incoming packets from a particular ingress port can be prevented from being directed to particular egress ports. With this system, two packets from the same source can be handled differently if the packets are received on different ingress ports.

The systems and methods described herein enable a variety of use cases. For example, a new topological layout in which a network 103 is effectively physical partitioned into different partitions which can be physically enforced. As another example, specific applications running on the network 103 may be provided exclusive access to particular parts of the network 103. In this way, a network 103 may be effectively logically partitioned. Traffic from other jobs and/or other users will not affect other jobs and/or other users. As a result, isolation is achieved.

Figure 2:
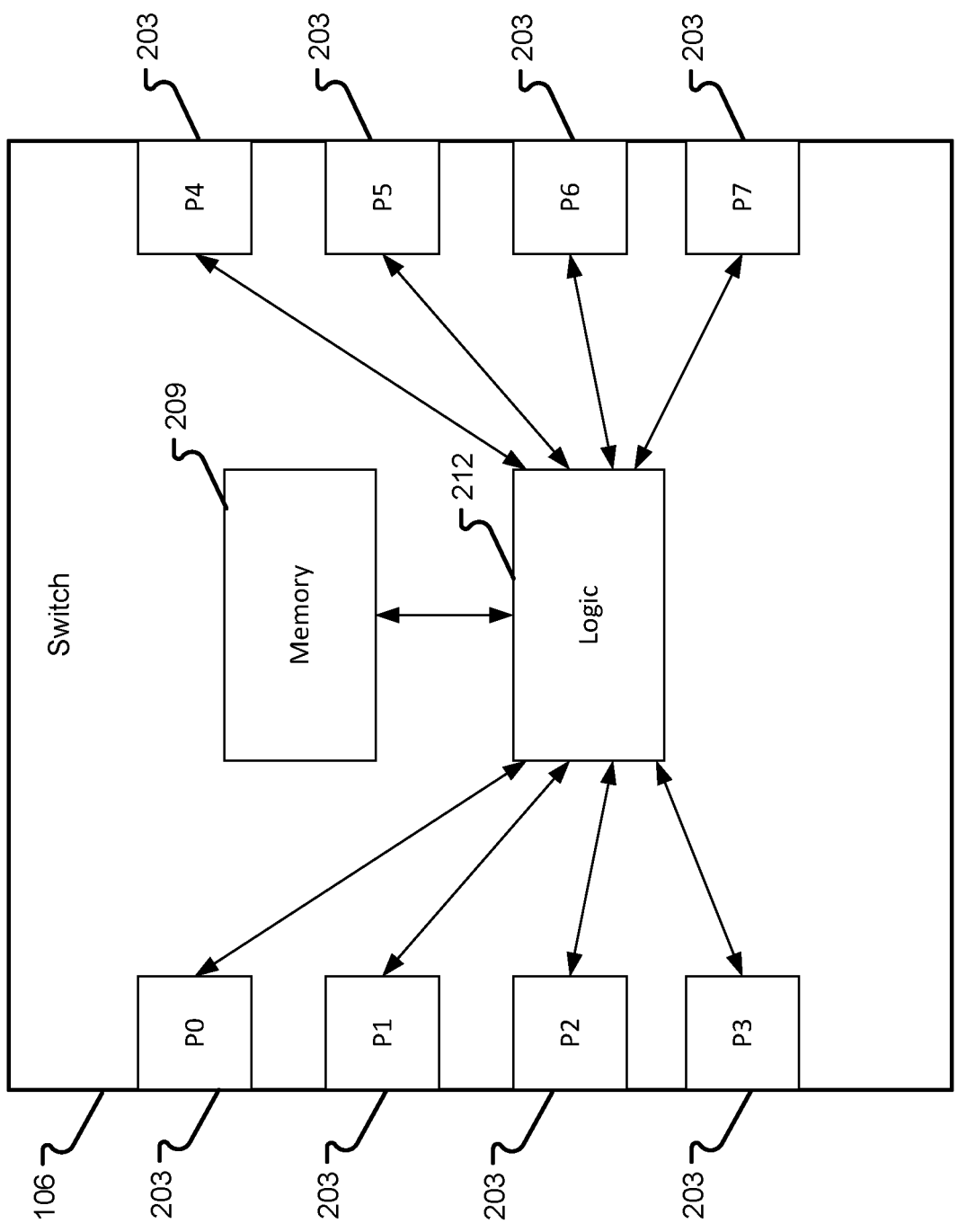
FIG. 2 is a block diagram of a networking device in accordance with one or more of the embodiments described herein.

As illustrated in FIG. 2, packets may be sent to a switch 106 via one or more ports 203. Each port 203 on a switch 106 is a point of connection for a device at a node 109 or another network device such as a switch 106. When a device sends a packet to a switch 106, the packet is received by the switch 106 on the port 203 to which the device is connected. Once received, the switch 106, using a logic device 212 such as a processor, reads the packet's destination address, looks up the destination address and the ingress port from which the packet was received in a filter table stored in memory 209, and forwards the packet out of an appropriate port 203 to reach the intended destination address.

Figure 3:
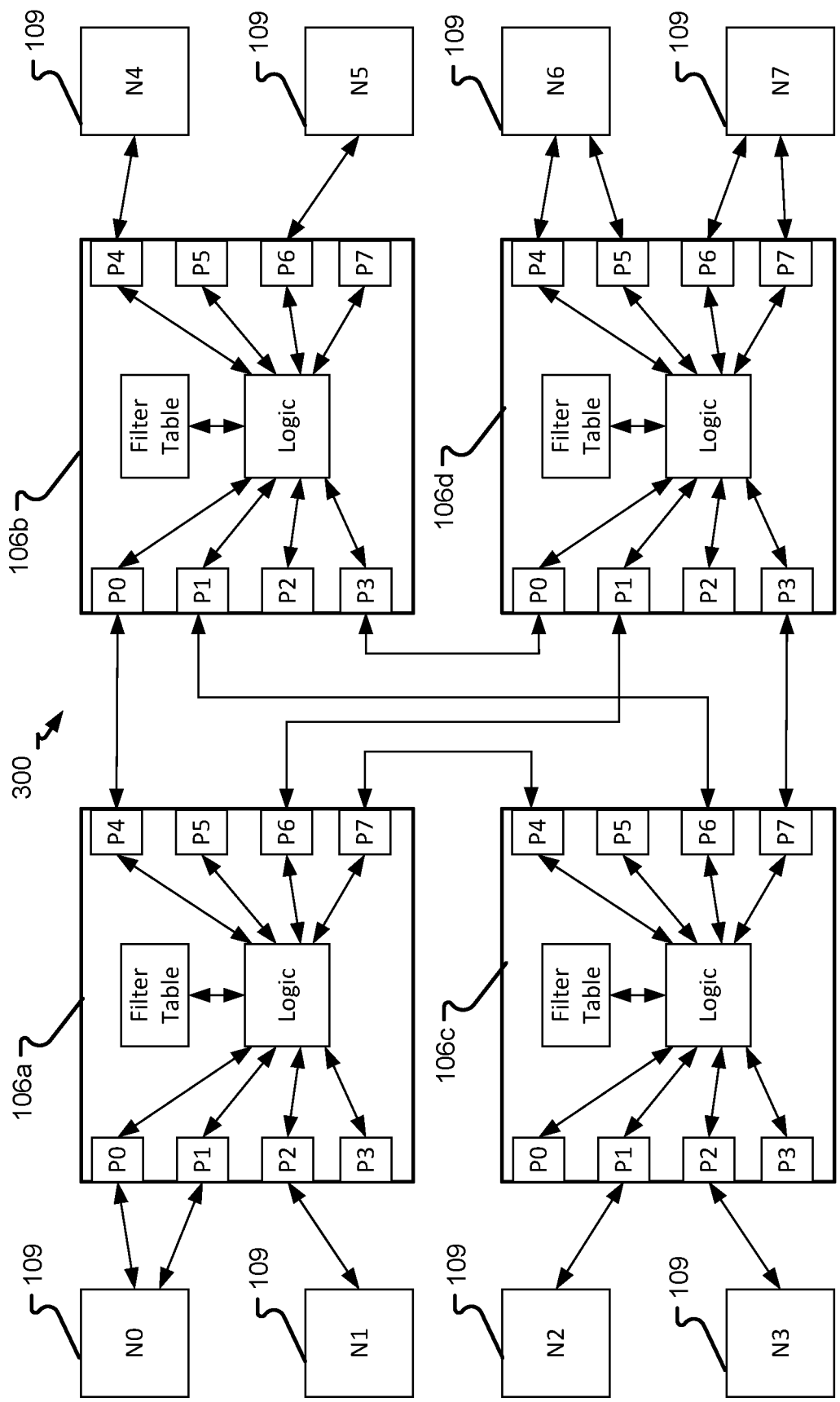
FIG. 3 is a block diagram of a networking environment in accordance with one or more of the embodiments described herein.

FIG. 3 illustrates a networking environment 300 including four switches 106*a-d* of a network 103, each interconnected and connected to a plurality of nodes N0-N7 109 via ports P0-P7. In the example illustrated in FIG. 3, a node N0 109 is connected to ports P0 and P1 of a first switch 106*a*. A node N1 109 is connected to a port P2 of the first switch 106*a*. A node N4 109 is connected to a port P4 of a second switch 106*b*. A node N5 109 is connected to a port P6 of the second switch 106*b*. A node N2 109 is connected to a port P1 of a third switch 106*c*. A node N3 109 is connected to a port P2 of the third switch 106*c*. A node N6 109 is connected to ports P4 and P5 of a fourth switch 106*d*. A node N7 109 is connected to port P6 and P7 of the fourth switch 106*d*. A port P4 of the first switch 106*a* is connected to a port P0 of the second switch 106*b*. A port P7 of the first switch 106*a* is connected to a port P4 of the third switch 106*d*. A port P6 of the first switch 106*a* is connected to a port P1 of the fourth switch 106*d*. A port P1 of the second switch 106*b* is connected to a port P6 of the third switch 106*d*. A port P3 of the second switch 106*b* is connected to a port P0 of the fourth switch 106*d*. A port P7 of the third switch 106*c* is connected to a port P3 of the fourth switch 106*d*.

It should be appreciated any number of switches 106 may be connected to any number of nodes 109 and/or other switches 106 in any conceivable arrangement. The example illustrated in FIG. 3 is provided for illustration purposes only.

Figures 4, 5:
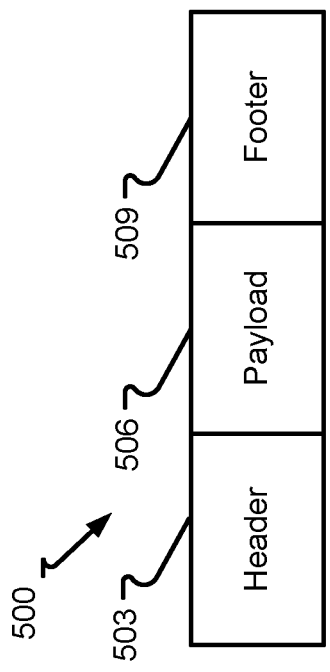
FIG. 4 is an illustration of a table in accordance with one or more of the embodiments described herein.
FIG. 5 is a block diagram of a packet in accordance with one or more of the embodiments described herein.

Using a system or method as described herein, packets sent to each switch 106 by a node 109 or another switch 106 may be handled differently by a particular switch 106 based on both the destination address off the packet as well as the ingress port from which the switch 106 receives the packet from the node 109 or from another switch 106. To make the routing decision, logic of the switch 106 may consult a filter table such as illustrated in FIG. 4.

Using conventional systems, routing of a packet is based solely on the destination of the packet. Conventional types of routing do not allow for partitioning a network 103 as described herein. Using a system as described herein, the routing of a packet may be based on the ingress port of the packet as well as the destination of the packet.

The present methods also enable routing to be performed while requiring a smaller amount of routing information such as required by a longest prefix match table (LFT). Previously, large LFT tables were required for each switch 106. These tables were used for forwarding packets. The structure of this table is in this format that each destination address and/or source address receives an entry listing which ports are approved to route a packet directed to and/or from the respective destination address and/or source address.

An LFT table is a data structure used in routers and other networking devices to determine the next hop for a packet. It is used to determine the most specific route for a packet by matching the destination IP address of the packet against a list of known routes in the table. An LFT table is essentially a routing table, which stores information about different routes and the next hop for each route. An LFT table uses a longest prefix match algorithm to find the most specific route for a packet. This means that the router will match the longest prefix of the destination IP address against the prefixes in the table, and the route with the longest matching prefix will be chosen as the next hop for the packet. Using a system as described herein, eliminates the need for the LFT table and provides a more efficient routing mechanism requiring less data and memory usage.

FIG. 4 illustrates a portion of a filter table 400 which may be used by a switch 106 to route a packet. The filter table 400 includes an entry for each of a number of destination addresses A-H. For each destination address, the filter table includes an entry for each possible pair of ports. A one indicates the pair of ports are blocked from transmitting packets to each other for that particular destination address. A zero indicates the pair of ports are allowed to transmit the packets to each other for that particular destination address. In some embodiments, the instructions may be different for each direction of communication, for example, the routing table may indicate a first port can use a second port as an egress port but the second port cannot use the ingress port. Using a filter table 400 as described herein, packets can be handled by a switch 106 based on both the destination address of the packet as well as the ingress port of the packet. Such a filter table 400 enables the security and performance lacking with contemporary routing mechanisms.

A filter table used in the systems and methods as described herein is different from conventional routing tables in that the filter table only tells the switch 106 which ports should be allowed to access which other ports. The size of the filter table is only the square of the number of ports with an entry for each destination address.

Using a filter table and system as described herein, a universal set of rules may be implemented for every destination. A particular ingress port cannot send to a particular egress port for all destinations, or distinct rules may be implemented for packets different destination addresses. Also, different rules can be enabled for unicast traffic, multicast traffic, etc.

It should be appreciated that in some embodiments, the filter table can be smaller by listing only the allowed ports or only the disallowed ports instead of listing all ports with an indication of whether each port is allowed or disallowed. Furthermore, while the table of FIG. 4 shows ones as where port connections are blocked and zeroes where port connections are enabled, the opposite may be used in certain embodiments.

Each switch 106 can be controlled separately with its own filter table. A routing engine, such as one executed by the network managing device 112 of the network 103, may be used to control the aggregate of all the switches 106 of the network 103 and each switch 106 can have its own filter table stored in memory 209 as illustrated in FIG. 2.

Every port of a switch 106 may or may not lead to a particular desired destination. For example, as illustrated in FIG. 3, only port P4 of the second switch 106b leads to node N4 109. For a packet to transmit from node N3 109, the packet must use port P2 of the third switch 106c as a first ingress port, port P6 of the third switch 106c as a first egress port, P1 of the second switch 106b as a second ingress port, and port P4 of the second switch 106b as a final egress port. As should be appreciated, for each destination address, the switches 106 have access to a list of output ports to use.

If there is a scenario in which ports fail or are not available or etc., then the packet may be dropped or lost. As an example, consider ports 1-4 of a switch 106 are usable but ports 2 and 4 are disabled due to rules in a filter table and ports 1 and 3 fail. In such an example, the packet is dropped. In some embodiments, there may a fail-safe scenario in which, if all ports fail except for the ports disabled due to filter table rules, then an escape route may be programmed in as a backup. For instance, a packet can, as a last resort, be transmitted on a port which it may not ordinarily be allowed in some embodiments.

A software manager, such as one executed by a network managing device 112, may issue packets that are instruction packets to each switch 106. If a routing table indicates there is an address 12345 and the address 12345 can use packets 1, 3, 5, and 8, the software manager can send an instruction packet making this update. In order to implement this new part of the routing process, a new instruction packet may be defined that contains the table. The instruction packet may instruct a switch 106, for a given address, every possible combination of input and output ports.

Updates to filter table entries can be sent out by the network managing device 112 as often as needed. Suppose there is a specific user or entity that needs to be isolated from others. That user or entity can be given a section of the network 103 that only it can use. An administrator may communicate with the software manager or network managing device 112 which may send out an update to the filter tables for each switch 106 in the form of instruction packets. Or consider an application usable by a user which is authorized to send out isolation instructions. Once a switch 106 receives such an instruction, the switch 106 can update its filter table and implement the new routing rules.

In an example scenario illustrating the performance benefits of the disclosed system, consider ports 3 and 4 of a switch 106 are used by two different users and each user is associated with a different node 109 or set of nodes 109. If both users are capable of using ports 3 and 4, the performance of the two users is correlated. If a first user sends packets of data from through port 4, then the second user will have to wait to use port 4. In this way, the second user will be impacted by the activities of the first user. As a result, using a system as described herein, isolation can be implemented for performance reasons.

In some embodiments, the switch 106 may alternatively spray a packet out of all available ports. The available ports may be determined based on the packet's destination address and ingress port. In some embodiments, the switch 106 may transmit the packet out of only one port of the ports allowed to transmit the packet based on the packet's destination address and ingress port.

In an example scenario illustrating the security benefits of the disclosed system, if two different users are using the same ports, each user may be capable of learning information about the other because each user has packets traversing the same ways. From a perspective of preserving security, this may be a point of vulnerability. Consider the possibility of an unfriendly user seeking to create a denial of service attack for example. The unfriendly user may crowd shared ports knowing another user is using the ports. The other user may be cut off from communication as a result. Using a system as described herein, isolation can be implemented for security reasons.

Using a system as described herein, unnecessary packet duplication resulting from multicast applications may be avoided, reduced, or eliminated. Suppose that packets from ports 1-3 of a switch 106 converge at some point in the future at another switch 106 and are duplicated as a result of multi-cast. When converging, the packets keep getting duplicated and then the flow is duplicated. As a result, the integrity of the network 103 is broken. Using a system as described herein can control the flow of data based on ingress ports, ensuring unnecessary packet duplication is avoided or reduced.

Using a system as described herein, a user may be enabled to force packets to be directed through a network 103 of switches 106 in a particular order and without the risk of packets becoming mis-ordered through the switches 106. For example, the user may want to use only one output port, effectively forcing the packets to arrive in a single path, avoiding the possibility of mis-ordered packets. Using a system as described herein, a user can control the routing of packets to allow only a single path through the network 103.

Using a system as described herein, a user may be enabled to create a flow path through particular ports. For example, ports may be selected based on a number of switches 106 which have to be routed through to reach a particular destination. The user may be enabled, using a system as described herein, to disable ports which lead to longer routes through the network 103, effectively reducing the number of switches 106 a packet must traverse through to proceed through the network 103.

As should be appreciated, a system as described herein enables a network 103 of switches 106 to route packets in many ways to achieve a wide variety of features.

As illustrated in FIG. 5, a data packet 500 may represent a unit of data transmitted over a network 103. A packet 500 contains information being sent in the form of a payload 506, as well as control information, such as the source and destination addresses. The control information may be stored in one or more of a header 503 and a footer 509 of the packet 500. Data packets 500 may be used in packet switching, a method of transmitting information in which data is broken down into small packets or data blocks, each of which may have its own header, which contains information about the source and/or destination address, and then sent out over the network 103. The packets may then be reassembled at the destination, allowing for efficient use of network resources and more reliable data transmission.

Figure 6A:
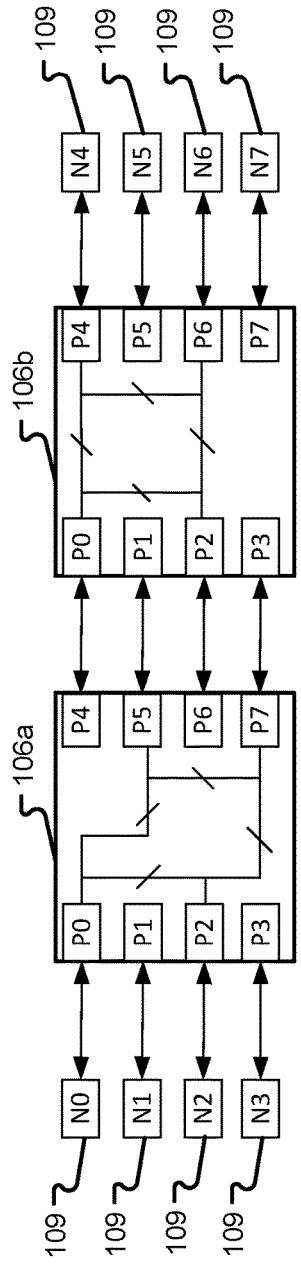
FIGS. 6A-6C are block diagrams of a networking environment in accordance with one or more of the embodiments described herein.
Figure 6B:
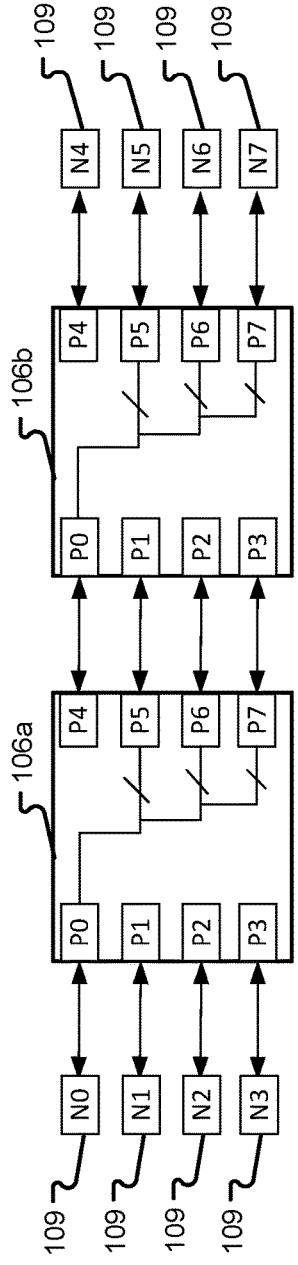
Figure 6C:
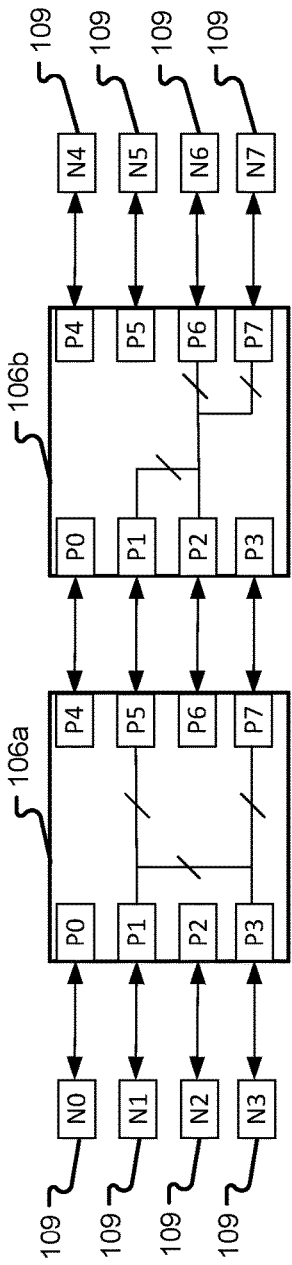

FIGS. 6A, 6B, and 6C each illustrate a pair of switches 106a and 106b connected to eight nodes N0-N7 109. A first node N0 109 is connected to a first port P0 of the first switch 106a. A second node N1 109 is connected to a second port P1 of the first switch 106a. A third node N2 109 is connected to a third port P2 of the first switch 106a. A fourth node N3 109 is connected to a fourth port P3 of the first switch 106a. A fifth node N4 109 is connected to a fifth port P4 of the second switch 106b. A sixth node N5 109 is connected to a sixth port P5 of the second switch 106b. A seventh node N6 109 is connected to a seventh port P6 of the second switch 106b. An eighth node N7 109 is connected to an eighth port P7 of the second switch 106b. A fifth port P4 of the first switch 106a is connected to a first port P0 of the second switch 106b. A sixth port P5 of the first switch 106a is connected to a second port P1 of the second switch 106b. A seventh port P6 of the first switch 106a is connected to a third port P2 of the second switch 106b. An eighth port P7 of the first switch 106a is connected to a fourth port P3 of the second switch 106b.

The lines within each switch 106a, 106b illustrate ports which are logically isolated from each other for a particular destination address. The three figures of FIGS. 6A, 6B, and 6C illustrate how packet isolation for a single group of switches 106 can be implemented in different ways based on destination addresses.

FIG. 6A illustrates logically isolated ports for a first destination address. For the first destination address, ports P0, P2, P5, and P7 are logically isolated. In effect, a packet with a destination address matching the first destination address received from one of ports P0, P2, P5, and P7 can only be transmitted by one or more of ports P1, P3, P4, and P6.

FIG. 6B illustrates logically isolated ports for a second destination address. For the second destination address, ports P0, P5, P6, and P7 are logically isolated. In effect, a packet with a destination address matching the second destination address received from one of ports P0, P5, P6, and P7 can only be transmitted by one or more of ports P1, P2, P3, and P4.

FIG. 6C illustrates logically isolated ports for a third destination address. For the third destination address, ports P1, P3, P5, and P7 are logically isolated. In effect, a packet with a destination address matching the third destination address received from one of ports P1, P3, P5, and P7 can only be transmitted by one or more of ports P0, P2, P4, and P6.

The routing rules illustrated for the set of switches 106a, 106b in FIGS. 6A-6C are provided for illustration purposes only. It should be appreciated any combination of rules may be implemented. While the rules of FIGS. 6A-6C are in groups, i.e., a group of ports are logically isolated from each other, it should be appreciated in some embodiments a packet received from a first port can transmitted by a second port, but a packet received from the second port may not be allowed to transmit from the first port. In this way, rules may be one-directional or bi-directional. Furthermore, while two switches 106a, 106b are illustrated, the same or similar systems may be implemented using more or fewer switches 106 in accordance with one or more of the embodiments described herein.

Figure 7:
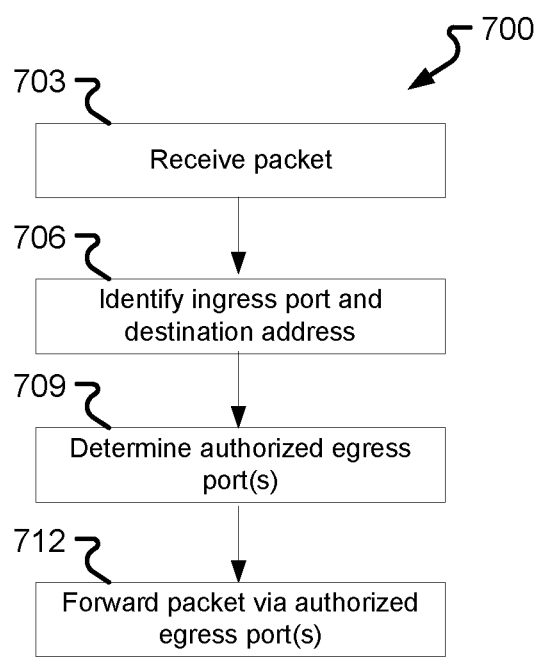
FIG. 7 is a block diagram of a networking environment in accordance with one or more of the embodiments described herein.

As illustrated in FIG. 7, a method 700 may be performed by a switch 106 or other type of networking device. The method 700 provides an exemplary system for dynamic logical port isolation. The method 700 may be performed by a logic device 212, such as a processor, of the switch 106 or other type of networking device. In some embodiments, the processor may be provided in a flow manager of a switch 106. A memory device 209 of the switch 106 may be coupled with the processor. The memory device 209 may comprise data stored thereon that, when processed by the processor, enables the processor to perform the method 700. The switch 106 performing the method 700 may be a switch 106 in a network 103 as described above and illustrated in FIG. 1.

It should be appreciated that the disclosed system can be implemented in any kind of network 103, such as data centers, high-performance computing, cloud computing technologies, ethernet, or any sort of computer networking protocol.

At 703, the switch 106 receives a packet via a port 203. The port 203 receiving a packet is considered an ingress port 203 of the packet for the switch 106. The packet may be a packet 500 as illustrated in FIG. 5. The switch 106 may receive packets from various sources. Sources of packets may be other devices on the network 103, such as computers, servers, and other network devices like routers, hubs, and/or other switches 106. For example, a packet may be received from another switch 106 in the network. When a packet is received by one switch 106, the switch 106 may forward the packet to a next switch 106 in the path until the packet reaches its final destination node 109 as indicated by its destination address.

When a packet is received by the switch 106 on an ingress port, the switch 106 will examine the packet's header to determine the packet's destination address. The switch 106 will then use this information in combination with the ingress port to forward the packet from an appropriate egress port or ports and on to its final destination node 109. The destination address may be, for example, a media access control (MAC) address.

At 706, the switch 106 may identify an ingress port and a destination address associated with the packet by analyzing a header of the packet and by determining from which port the packet was received. Each port may be associated with a port identifier. A port identifier may be a number or code specifying one particular port. Identifying the ingress port may comprise determining the port identifier associated with the port from which the packet was received.

At 709, the switch 106 may determine, based on the ingress port and the destination address, one or more egress ports authorized to transmit the packet. Using a system or method as described herein, for packets associated with a particular destination address, one or more ingress ports may be isolated from one or more egress ports. A first packet associated with a first destination address and received via a first ingress port may be authorized to be transmitted from a first egress port and a second packet associated with a second destination address and received via the first ingress port may be not authorized to be transmitted from the first egress port.

A filter table 400 such as illustrated in FIG. 4 may be referenced to determine that the one or more egress ports are authorized to transmit the packet. As illustrated in FIG. 4, the filter table may list, for each of a plurality of destination addresses, one or more sets of pairs of ingress ports and egress ports authorized for transmission.

The filter table 400 used by the switch 106 to route the packet may be received from a network managing device 112 or may be updated based on information received from the network managing device 112. The filter table may also or alternatively be modified based at least in part on traffic data received by the switch 106. Determining the one or more egress ports authorized to transmit the packet may be based at least in part on traffic data received by the system.

For example, the switch 106 may receive instructions to update or modify or replace the filter table from a network managing device 112 or from another network device. In some embodiments, the switch 106 may receive a packet containing instructions for updating the filter table. Any changes to the filter table may be implemented by the switch 106 automatically and in real-time. By enabling a switch 106 to modify a filter table in real-time, on-the-fly isolation may be achieved.

At 712, in response to determining the packet is authorized for transmission, the switch 106 may forward the packet to the destination address via the one or more egress ports determined to be allowed to transmit the packet. As described above, the packet may be transmitted from only one, some, or all of the ports allowed to transmit the packet based on the packet's destination address and port of ingress. It should be appreciated the packet may be transmitted to its final destination, such as a node 109 of the network 103, or to another switch 106 on the path towards the final destination.

The present disclosure encompasses embodiments of the method 700 that comprise more or fewer steps than those described above, and/or one or more steps that are different than the steps described above.

The present disclosure encompasses methods with fewer than all of the steps identified in FIG. 7 (and the corresponding description of the method 700), as well as methods that include additional steps beyond those identified in FIG. 7 (and the corresponding description of the method 700). The present disclosure also encompasses methods that comprise one or more steps from one method described herein, and one or more steps from another method described herein. Any correlation described herein may be or comprise a registration or any other correlation.

As noted above, the present disclosure encompasses methods with fewer than all of the steps identified in FIG. 7 (and the corresponding description of the method 700), as well as methods that include additional steps beyond those identified in FIG. 7 (and the corresponding description of the method 700). The present disclosure also encompasses methods that comprise one or more steps from one method described herein, and one or more steps from another method described herein. Any correlation described herein may be or comprise a registration or any other correlation.

Embodiments of the present disclosure aim to provide logical isolation in a communication network. Embodiments of the present disclosure include a system for providing dynamic logical port isolation, the system comprising: a processor; and a memory device coupled with the processor, wherein the memory device comprises data stored thereon that, when processed by the processor, enables the processor to: receive a packet; identify an ingress port and a destination address associated with the packet; determine, based on the ingress port and the destination address, one or more egress ports authorized to transmit the packet; and in response to determining the one or more egress ports authorized to transmit the packet, forward the packet to the destination address via the one or more egress ports.

Aspects of the above system include wherein the packet is received via the ingress port.

Aspects of the above system include wherein the processor is provided in a flow manager of a switch.

Aspects of the above system include wherein the packet is received from a switch.

Aspects of the above system include a filter table is referenced to determine that the one or more egress ports are authorized to transmit the packet.

Aspects of the above system include wherein the filter table lists, for each of a plurality of destination addresses, one or more sets of pairs of ingress ports and egress ports authorized for transmission.

Aspects of the above system include wherein the filter table is received from a network managing device.

Aspects of the above system include wherein the filter table is modified based at least in part on traffic data received by the system.

Aspects of the above system include wherein determining the one or more egress ports authorized to transmit the packet is based at least in part on traffic data received by the system.

Aspects of the above system include wherein for packets associated with a particular destination address, one or more ingress ports are isolated from one or more egress ports.

Aspects of the above system include wherein a first packet associated with a first destination address and received via a first ingress port is authorized to be transmitted from a first egress port and a second packet associated with a second destination address and received via the first ingress port is not authorized to be transmitted from the first egress port.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

It is to be appreciated that any feature described herein can be claimed in combination with any other feature(s) as described herein, regardless of whether the features come from the same described embodiment.

What is claimed is:

1. A system for providing dynamic logical port isolation, the system comprising:
    a processor; and
    a memory device coupled with the processor, wherein the memory device comprises data stored thereon that, when processed by the processor, enables the processor to:
        receive a packet via an ingress port, wherein the packet is associated with a destination address;
        determine, based on the ingress port and the destination address associated with the packet, one or more egress ports are authorized to transmit packets both received via the ingress port and associated with the destination address; and in response to determining the one or more egress ports are authorized to transmit packets both received via the ingress port and associated with the destination address, forward the packet to the destination address via at least one of the one or more egress ports.

2. The system of claim 1, wherein the processor is provided in a flow manager of a switch.

3. The system of claim 1, wherein the packet is received from a switch.

4. The system of claim 1, wherein a filter table is referenced to determine that the one or more egress ports are authorized to transmit the packet.

5. The system of claim 4, wherein the filter table lists, for each of a plurality of destination addresses, one or more pairs of ingress ports and egress ports authorized for transmission.

6. The system of claim 5, wherein determining the one or more egress ports are authorized to transmit packets both received via the ingress port and associated with the destination address comprises determining the ingress port and the destination address match a pair of ingress ports and egress ports.

7. The system of claim 4, wherein the filter table is modified based at least in part on traffic data received by the system.

8. The system of claim 1, wherein determining the one or more egress ports are authorized to transmit packets both received via the ingress port and associated with the destination address is based at least in part on traffic data received by the system.

9. The system of claim 1, wherein for packets associated with a particular destination address, one or more ingress ports are isolated from one or more egress ports.

10. The system of claim 1, wherein a second one or more egress ports are not authorized to transmit packets both received via the ingress port and associated with the destination address.

11. A switch, comprising a processor to perform:
receiving a packet via an ingress port, wherein the packet is associated with a destination address;
determining, based on the ingress port and a destination address associated with the packet, one or more egress ports are authorized to transmit packets both received via the ingress port and associated with the destination address; and
in response to determining the one or more egress ports are authorized to transmit packets received via the ingress port and associated with the destination address, forwarding the packet to the destination address via at least one of the one or more egress ports.

12. The switch of claim 11, wherein the processor is provided in a flow manager of the switch.

13. The switch of claim 11, wherein the packet is received from a second switch.

14. The switch of claim 11, wherein a filter table is referenced to determine that the one or more egress ports are authorized to transmit the packet.

15. The switch of claim 14, wherein the filter table lists, for each of a plurality of destination addresses, one or more pairs of ingress ports and egress ports authorized for transmission.

16. The method of claim 15, wherein determining the one or more egress ports are authorized to transmit packets both received via the ingress port and associated with the destination address comprises determining the ingress port and the destination address match a pair of ingress ports and egress ports.

17. The switch of claim 11, wherein for packets associated with a particular destination address, one or more ingress ports are isolated from one or more egress ports.

18. A networking device, comprising a processor to perform:
receiving a packet via an ingress port, wherein the packet is associated with a destination address;
determining, based on the ingress port and a destination address associated with the packet, one or more egress ports are authorized to transmit packets both received via the ingress port and associated with the destination address; and
in response to determining the one or more egress ports are authorized to transmit packets received via the ingress port and associated with the destination address, forwarding the packet to the destination address via at least one of the one or more egress ports.

19. The networking device of claim 18, wherein a filter table is referenced to determine that the one or more egress ports are authorized to transmit the packet.

20. The networking device of claim 19, wherein the filter table lists, for each of a plurality of destination addresses, one or more pairs of ingress ports and egress ports authorized for transmission.

* * * * *